June 9, 1959  R. W. FRANK, JR  2,889,637
RADAR TRAINING AND DEMONSTRATION EQUIPMENT
Filed March 17, 1954  7 Sheets-Sheet 2

INVENTOR.
RALPH W. FRANK, JR.
BY
Woodling and Krost,
attys.

June 9, 1959  R. W. FRANK, JR  2,889,637
RADAR TRAINING AND DEMONSTRATION EQUIPMENT
Filed March 17, 1954  7 Sheets-Sheet 1

INVENTOR.
RALPH W. FRANK, JR.
BY Woodling and Krost,
attys.

Fig.4

INVENTOR.
RALPH W. FRANK, JR.
BY Woodling and Krost,
attys.

June 9, 1959  R. W. FRANK, JR  2,889,637
RADAR TRAINING AND DEMONSTRATION EQUIPMENT
Filed March 17, 1954  7 Sheets-Sheet 4

INVENTOR.
RALPH W. FRANK, JR.
BY Woodling and Krost,
attys.

June 9, 1959   R. W. FRANK, JR   2,889,637
RADAR TRAINING AND DEMONSTRATION EQUIPMENT
Filed March 17, 1954   7 Sheets-Sheet 7

Fig. 10

INVENTOR.
RALPH W. FRANK, JR.
BY Woodling and Krost,
attys.

United States Patent Office 2,889,637
Patented June 9, 1959

2,889,637

RADAR TRAINING AND DEMONSTRATION EQUIPMENT

Ralph W. Frank, Jr., Strongsville, Ohio, assignor to Ralph W. Frank, Sr., Strongsville, Ohio Application March 17, 1954, Serial No. 416,865

18 Claims. (Cl. 35—10.4)

The invention relates in general to simple training and demonstration equipment of complex technical devices such as simulated radar or sonar demonstration equipment and more particularly to a transportable mechanism which simulates movement of objects or aircraft and also simulates a radar oscilloscope to show the path of movement of such aircraft thereon.

For civil defense purposes, radar operator training, and any other uses of similar nature it is often extremely desirable to be able to explain the fundamentals of radar equipment in a facile manner to laymen and others who are not technically trained. In the civil defense organization there are many non-technically trained personnel who in furtherance of the best performance of their job should have at least a rudimentary knowledge of the basic operation of radar equipment. The ground observation corps especially, who will be working with filter centers and the like, can perform their function better if they know how radar stations perform their work since radar stations also send their information to such filter centers. Further, the ground observer personnel and the like can perform their own job better if they understand the limitations as well as the capabilities of radar equipment, and understand that their work complements that of the radar equipment.

Radar equipment is in general highly complex; and even if such equipment were not classified so that civil defense personnel and the like could visit such radar stations, they could not easily learn the operation of such radar equipment due to the maze of such technical apparatus involved. Also, radar stations are not necessarily located at places convenient to visitation by civil defense personnel.

It is an object, therefore, of the invention to provide simple and readily demonstratable equipment which will explain the fundamentals of technical equipment such as reflected wave equipment, including radar and sonar devices to people of non-technical training.

Another object of the invention is to provide a combined terrain panel and oscilloscope with interconnection means therebetween so that the movements indicated thereon are synchronized.

Another object of the invention is to provide a terrain panel which is a three-dimensional relief map and which has a radar station and aircraft paths simulated thereon and to provide a simulated oscilloscope having a translucent face wherein spots of light show thereon to simulate the "blips" on an actual radar oscilloscope tube and with these spots of light indicating a path or course of the aircraft which is synchronized with and which corresponds to the path of the aircraft on the terrain panel.

Another object of the invention is to provide a terrain panel of moderate size which has a three-dimensional configuration indicating mountains, valleys, municipalities, radar stations, and the like and which will stand abuse encountered in transporting the equipment.

Another object of the invention is to provide an oscilloscope housing of moderate size such as the size of an ordinary television console and which has a translucent face simulating the radar oscilloscope tube face with a rotatable trace line and simulated blips and with the blips having a fading characteristic to simulate the phosphorescence or retentivity of the phosphor on the oscilloscope tube face. Also, the tube face would indicate permanent echoes, the radar station and location, and the ground clutter around the radar station.

Another object of the invention is to provide a training aid utilizing physical equipment to enable radar operating personnel to gain practice in observing "blips" on a radar oscilloscope and thus gain experience in tracking and vectoring aircraft as to their azimuthal direction.

Another object of the invention is to provide a simulated oscilloscope for training wherein the direction of the paths created by spots of light may be varied at will to thus enable an observer of the oscilloscope to get greater training in reading the azimuthal direction of the spots of light.

Another object of the invention is to provide simulated radar demonstration equipment which includes a terrain panel and an oscilloscope with the oscilloscope providing the master control to coordinate or synchronize the aircraft paths simulated on the oscilloscope and on the terrain panel.

Another object of the invention is to provide a terrain panel having lamp means thereon which are illuminable at spaced intervals to simulate paths of aircraft and with these illuminable spaced intervals controlled by and hence synchronized with a simulated oscilloscope.

Another object of the invention is to utilize coordinated lights to indicate the activity of operating personnel, such as radar and ground observer personnel, to illustrate the coordination and sequence of events among all concerned.

Other objects and a fuller understanding of this invention may be had by referring to the following description and claims, taken in conjunction with the accompanying drawings, in which:

Figure 5 is a plan view of the switch actuator mechanism;

Figure 8 is a schematic diagram of one of the potentiometers;

Figures 1, 2:
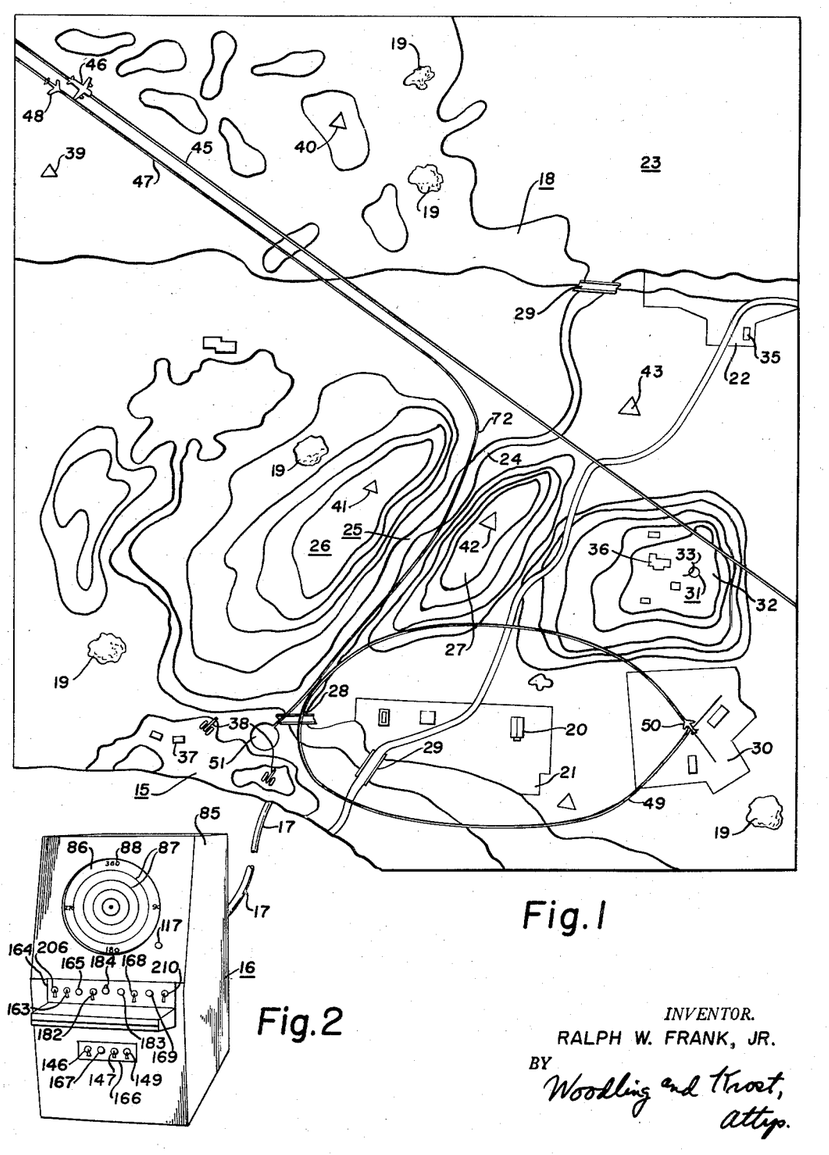
Figure 1 is a plan view of a three-dimensional relief map of a sample terrain.
Figure 2 is a three-dimensional view of an oscilloscope housing.
Figure 11:
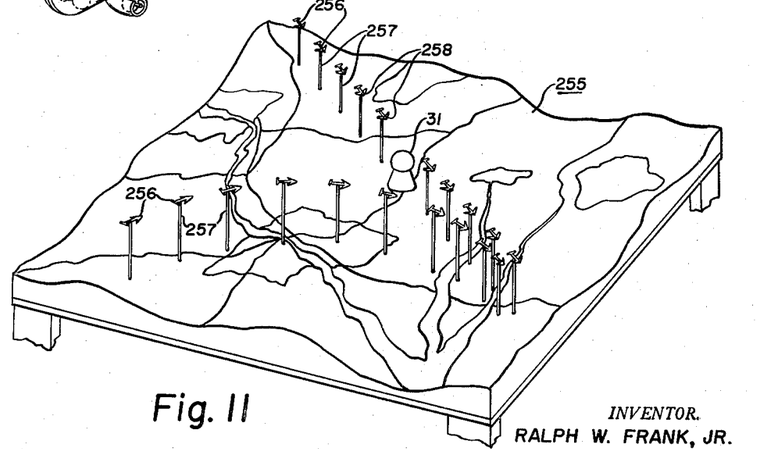
Figure 11 is a modified form of aircraft path indicator on the terrain panel; and, Figure 12 is a modified form of synchronizing means between the terrain and oscilloscope panels.

The Figure 1 represents a top or plan view of a terrain panel 15 which may be of convenient size for demonstration purposes, for example, 6 by 8 feet. It may also be conveniently provided with legs, such as shown in Figure 11, to raise it to convenient table height. The terrain panel shown in Figure 1 in this preferred embodiment is used in conjunction with an oscilloscope panel 16 as shown in Figure 2. The two may be connected together by interconnection means 17. The terrain panel 15 and the oscilloscope panel 16 are designed to be used together to train and to demonstrate to people, especially non-technically trained people, the general operation of reflected wave equipment and the tracking of movable objects, which in the preferred embodiment has been illustrated as radar equipment. The terrain panel 15 simulates any typical or sample terrain 18. This is prepared in three-dimensional form to more readily enable observers to visualize the terrain which the panel 15 represents. This three-dimensional effect may be achieved by papier-mache or preferably by sponge rubber which will stand considerable abuse and may easily simulate trees 19, houses 20, and the like. In this terrain panel 15 there is shown a first municipality 21 and a second municipality 22. The municipality 22 is shown adjoining a lake or other body of water 23. A river 24 flows into the lake 23 and flows through a valley 25 formed between a ridge 26 and a ridge 27. Bridges 28 and 29 cross the river 24.

An air field 30 is shown near one edge of the terrain 18 and a radar station 31 is located on a small hill 32. A radar antenna 33 is provided at the radar station 31, and is rotated by a slave selsyn 34, shown in Figure 6. A filter center 35 is located in the municipality 22. An alerting headquarters 36 is shown near the radar station 31. Gun laying radar 37 is shown as controlling antiaircraft batteries 38. Ground observer posts 39 and 40 are located near the upper left portion of the terrain 18, and other ground observer posts 41, 42 and 43 may also be present.

A first path 45 of a commercial aircraft 46 traverses the terrain panel 15. A second path 47 of an unidentified aircraft 48 also is located on the terrain panel 15. A third path 49 of an interceptor aircraft 50 is also located on the terrain panel 15. The unidentified aircraft path 47 ends at location 51, whereas the interceptor aircraft path 49 continues around and both commences and terminates at the air field 30.

Figure 3:
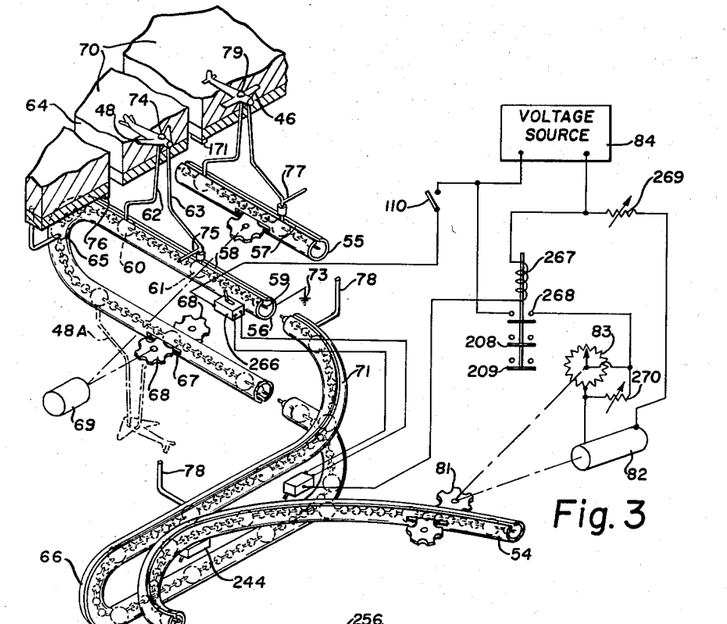
Figure 3 is a partial sectional view of the drive mechanism for aircraft on the terrain panel.

The Figure 3 illustrates the mechanism for providing an indication of aircraft on the paths 45, 47 and 49. A guide tube 55 is used for the commercial aircraft 46, and similarly guide tubes 54 and 56 are used for the interceptor and unidentified aircrafts 50 and 48. The guide tubes 55 and 56 have continuous longitudinal slots 57 and 58, respectively, in the outermost periphery thereof. The construction of the several aircraft paths is similar, and a description of that pertaining to the unidentified aircraft 48 will be referred to in greater particularity. The guide tube 56 carries a beaded chain 59 which carried two larger beads 60 and 61. Wires 62 and 63 extend from the beads 60 and 61, respectively, through the slot 58 to the aircraft 48. The wires 62 and 63 extend through a narrow slot 64 in the terrain 18, and this slot 64 is adjacent and co-planar with the slot 58. The tube 56 has two opposite bends 65 and 66 so that the tube 56 is continuous as is the chain 59. Drive slots 67 are cut in opposite sides of the tube 56 and drive gears 68 interengage opposite sides of the beaded chain 59. One of the drive gears 68 is rotated by an electric drive motor 69 which also drives the chain in the guide tube 55. In phantom view at reference numeral 48A is shown the unidentified aircraft 48 in a position when this aircraft is carried underneath the terrain panel 15 in an inverted position. The end bend 65 of the tube 56 is near one side 70 so that the aircraft comes up from underneath the panel 15 to be carried along the path 47.

The tube 56 has a bend 71 at the center thereof so that the path 47 diverges from the path 45 during the latter portion thereof. The bend 71 corresponds to a bend 72 in the path 47. Also, about at the bend 72 the unidentified aircraft 48 dips down into the valley 25 so as to be below the ridge 27 with respect to the radar station 31. To effect this dip of the unidentified aircraft 47, the guide tube 56 also dips down near the bend 71 relative to the plane of the terrain panel 15 so that the aircraft 48 comes closer to the surface of the river 24. The length of the guide tube 56 is preferably the same length as the guide tube 55, so that the motor 69 may drive both aircraft 46 and 48 in synchronism, but not necessarily the same length as the guide tube 54 used for guiding the interceptor aircraft 50. There are two commercial aircraft equally spaced on the chain within the guide tube 55, but only a single unidentified aircraft 48 and a single interceptor aircraft 50 on their respective chains. The beaded chain 59 permits full three-dimensional flexibility in the paths, and even permits banking of the aircraft by placing the slot 58 toward the inside of a curve in the guide tube.

The wire 62 is electrically connected to the bead 60 which electrically contacts the guide tube 56 and which is in turn grounded as shown at 73. Inside the unidentified aircraft 48 is a lamp 74. The wires 62 and 63 are connected to this lamp 74, and the wire 63 is insulated from the bead 61. A contact finger 75 is electrically connected to the wire 63 and is adapted to contact stationary elongated contact means 76 provided periodically along the path 47. When the contact finger 75 is in contact with the particular one of the elongated contacts 76, which also is electrically energized at that time, then the lamp 74 will be illuminated. Similarly, a lamp 79 is provided in the commercial aircraft 46 and energized by a contact finger 77 engaging contacts 171 to 181 spaced along the path thereof; and a lamp, not shown in Figure 3, is similarly provided in the interceptor aircraft 50. The lamps within the aircraft 46 and 50 may be illuminated sequentially in a similar manner to the illumination of the lamp 74. The tubes for each of the aircraft may be suspended below the terrain panel, as by the brackets 78.

The chain in the guide tube 54 for the interceptor aircraft is driven by a slow speed sprocket wheel 81 driven in turn by a variable speed motor 82, such as a series or universal motor. The motor 82 is energized through a rheostat 83 from a voltage source 84. This source may be any convenient voltage source, and preferably is the transformer 144 shown in Figure 6, with leads passing through the interconnection means 17. The movable contact arm of the rheostat 83 is driven at one revolution for each revolution of the interceptor aircraft 50 in its guide tube 54.

Figure 4:
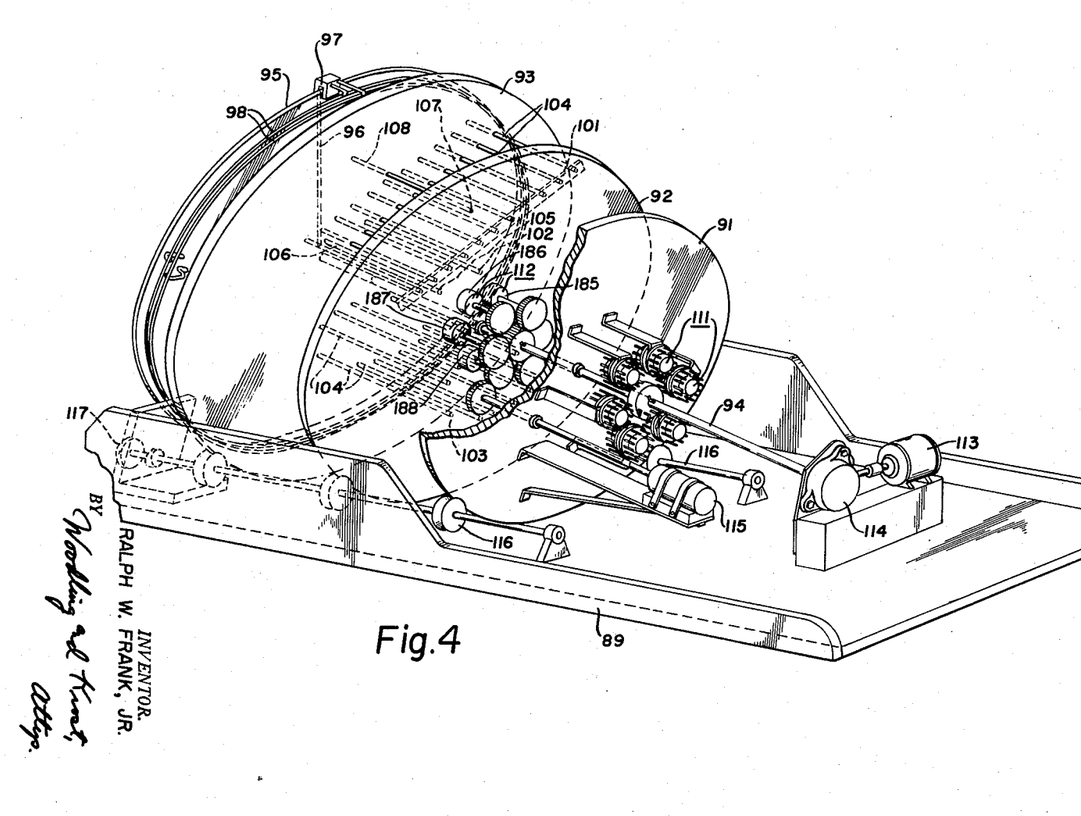
Figure 4 is a three-dimensional view of the mechanism within the oscilloscope housing.
Figure 10:
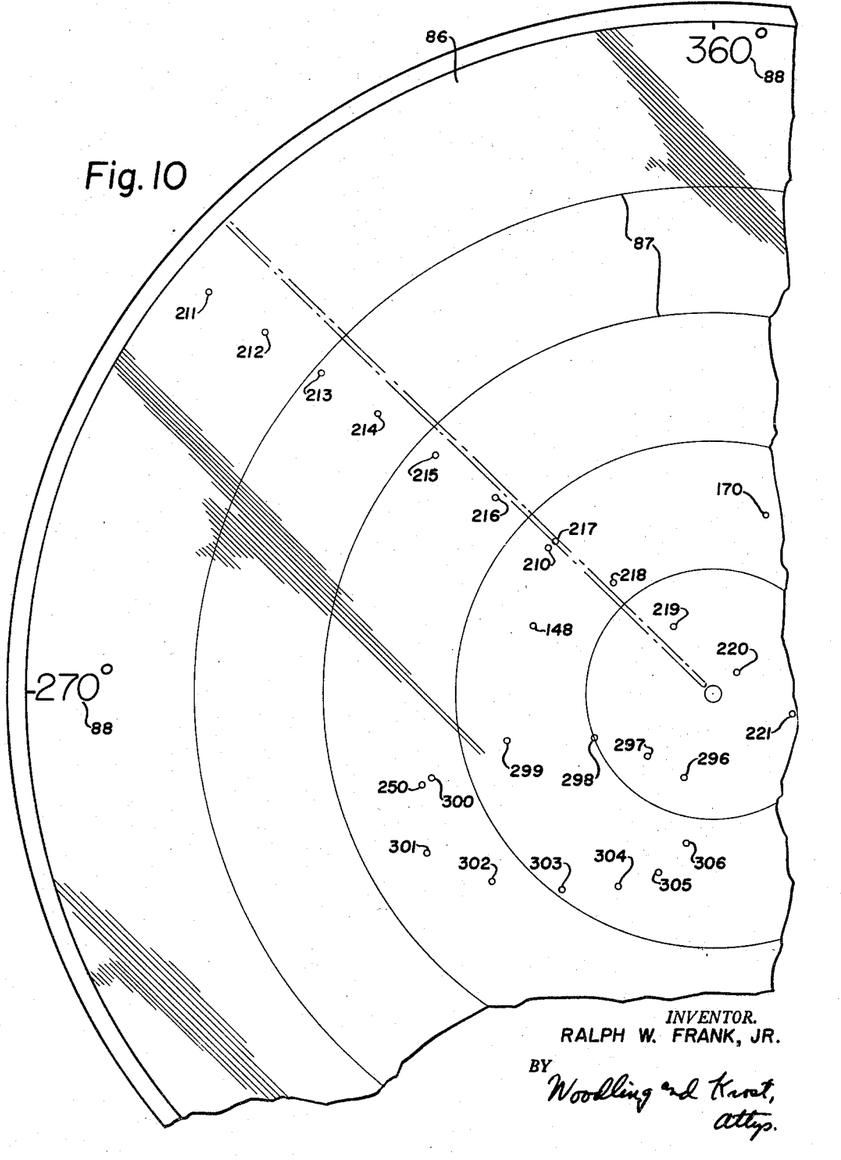
Figure 10 is an enlarged front view of the oscilloscope face, showing the spots of light.

The oscilloscope panel 16 includes generally a housing 85 carrying a transparent mask 86. This is illustrated in Figures 2 and 10. The mask 86 carries concentric circles 87 scribed thereon, which indicate the range of the radar equipment, and azimuth marks 88. A chassis 89 is mounted within the housing 85, as shown in Figure 4. The chassis 89 carries first, second and third frames 91, 92 and 93. A main shaft 94 is journaled through the three frames. A circular oscilloscope face 95 is fastened to the main shaft 94 to rotate therewith. This oscilloscope face is translucent and tinted green; and when the chassis 89 is positioned within the housing 85, the face 95 is positioned directly behind and generally concentric with the transparent mask 86.

A transparent plastic trace rod 96 is fastened to the face 95 to rotate therewith. This trace rod 96 is positioned generally radially on the face and immediately behind same. A trace lamp 97 is mounted in a socket at one end of the trace rod 96, in this case the outer end, so that illumination from the lamp 97 extends lengthwise through the rod 96. Electrical connections to the socket of the trace lamp 97 are afforded through slip rings 98.

The second frame 92 carries first, second and third lines of lamps 101, 102 and 103. The first and third lines 101 and 103 include a plurality of lamps, and in this preferred embodiment the second line 102 carries only two lamps. The third frame 93 carries a plurality of transparent plastic blip rods 104 each of which extends between the face 95 and each of the individual lamps in the lines 101, 102 and 103. These blip rods 104 transmit the light from the individual lamps to the oscilloscope face 95. When any particular lamp is illuminated, the light is transmitted to the oscilloscope face 95 to appear as a spot of light thereon. The third frame 93 is opaque to block off all extraneous illumination from the lamps in the lines 101, 102 and 103. One or more lamps 105 and corresponding rods 106 are near the center of said face 95 to simulate ground clutter, such as might be caused by the alerting headquarters 36. Also, one or more lamps 107 and rods 108 may be used to simulate permanent echoes, such as caused by the ridge 27, or buildings in the municipality 22.

The first frame 91 carries switch means 111 and the second frame 92 may carry potentiometer means 112 driven by the main shaft 94. A drive motor 113 drives the main shaft at a low speed in the order of one to ten revolutions per minute through a gear reduction unit 114. A master selsyn 115 is also driven in a one to one ratio from the main shaft 94.

The frames 91, 92 and 93 preferably are circular, and carried for rotation on roller shafts 116 journaled on the chassis 89. One of the shafts 116 carries a handwheel 117 extending through the front of the oscilloscope housing 85 so that an operator of the oscilloscope may frictionally drive all frames to change the azimuthal direction of the various lamp lines 101, 102 and 103.

Figures 5, 8, 12:
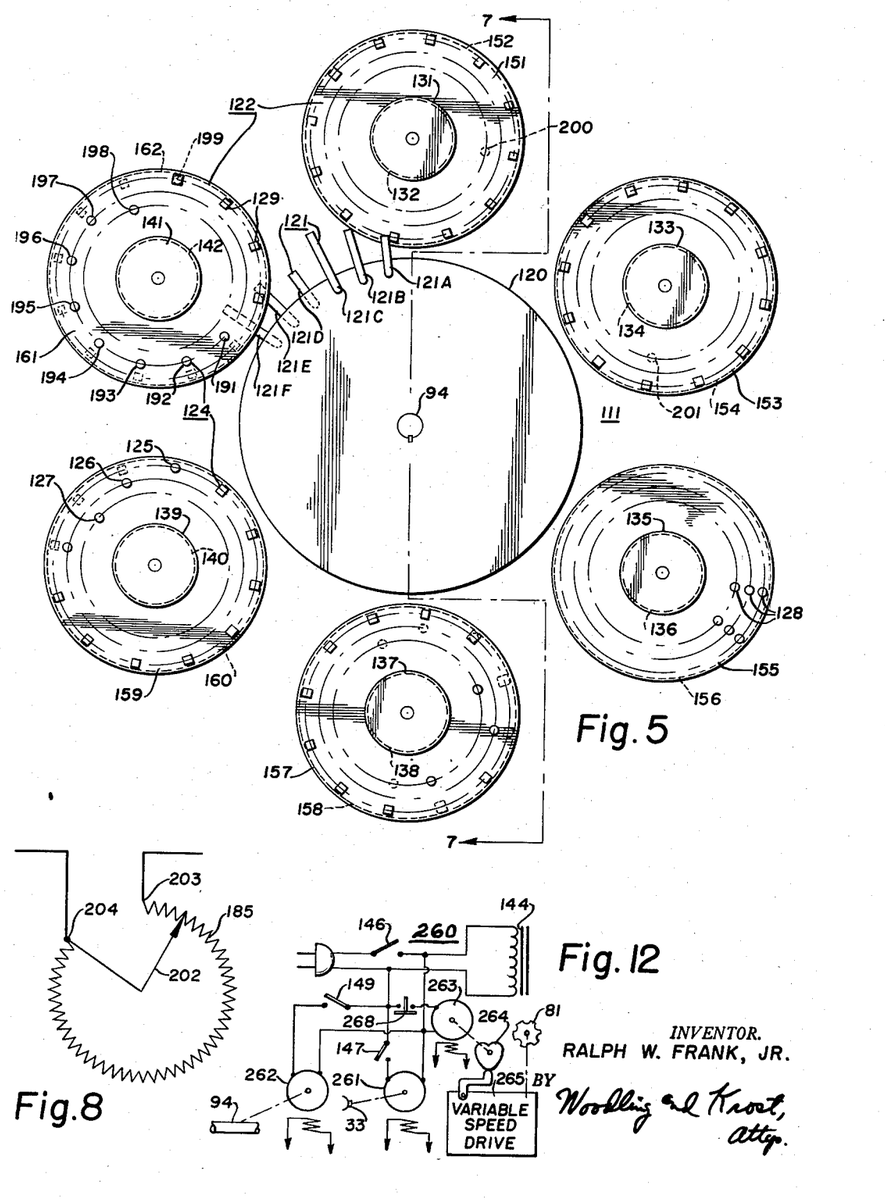
Figure 7:
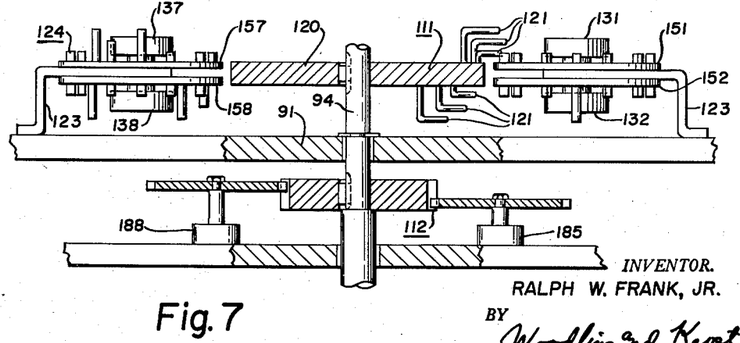
Figure 7 is a sectional view on the line 7—7 of Figure 5.

The Figures 5 and 7 better illustrate the construction of the switch means 111. A switch actuator 120 is fixedly mounted on the main shaft 94 for rotation therewith. The switch actuator 120 has actuator arm means 121 which actuate cog means 124 on cogwheel means 122, in turn actuating the switch means 111. In this preferred embodiment the switch means 111 includes switches 131 to 142, inclusive. Each of these switches is a 12-position switch. The cogwheel means 122 includes first through twelfth cogwheels 151 to 162, inclusive. The Figure 7 shows that the frame 91 rotatably carries the cogwheels 151 through 162 as by the brackets 123. These cogwheels are therefore journaled for rotation on axes parallel to the main shaft 94 and equally spaced around this main shaft. The first through twelfth cogwheels 151 through 162 are respectively connected to the corresponding switches 131 through 142. The actuator arm means 121 in this case includes six actuator arms 121A through 121F. As shown in Figures 5 and 7, the actuator arm 121A is short and is close to the plane of the switch actuator 120. The switch actuator arm 121C is relatively long and remote from the plane of the switch actuator 120. The actuator arm 121B is intermediate in length and distance from the plane of the switch actuator 120. Similarly, the actuator arms 121D, 121E and 121F progressively become longer and farther away from the plane of the switch actuator 120. The actuator arms 121A through 121C are on one side of the actuator 120 and actuate cogwheels 151, 153, 155, 157, 159 and 161; and the actuator arms 121D through 121F are on the opposite side of the switch actuator 120 and actuate the cogwheels 152, 154, 156, 158, 160 and 162.

Each of the cogwheels 151 through 162 includes the laterally extending pegs or cog means 124 which may be engaged by the actuator arm means 121. These cog means 124 are arranged generally along radials on the cogwheels with the radials being twelve in number since the cogwheels control 12-position switches. The cog means 124 may be positioned in any one of three different radii from the center of the respective cogwheel. The cog means include short cogs 125 placed near the rim of the cogwheels, intermediate length cogs 126 placed at an intermediate radius on the cogwheels, and long cogs 127 placed on the shortest radius on the cogwheels.

The Figure 5 shows the cogwheel 155 as having three holes 128 in two of the twelve radials. Each of the cogwheels has such holes 128 in each of the radials, but they have not been shown in Figure 5 in order to avoid confusion with the cog means 124. It will be understood that each of the pegs or cogs 125, 126 and 127 may be inserted in any desired hole 128. In practice, only one cog is placed in the series of three holes in any given radial. Several round or cylindrical cogs 125, 126 and 127 have been shown as placed on the cogwheels 152, 154, 157, 158, 159, 160, 161 and 162. On these particular cogwheels, which have round cogs on some of the radials, there are also shown square or rectangular cogs 129, which cooperate with the actuator arm means 121 to make certain that each of the cogwheels is rotated 30 degrees for each revolution of the switch actuator 120. In practice, the cogs 129 would preferably be made round the same as the cogs 125, 126 and 127; however, they have been shown as square in the Figure 5 in order to avoid confusion. It is only the round cogs 125, 126 and 127 which indicate an active position on the respective switch to which the cogwheel is connected. In order to provide the greatest clearance between the actuator arms and the succeeding cog, and to insure positive actuation of each of the cogwheels, the index position of each of the radials is 10 degrees ahead, and consequently 20 degrees behind, the reference line joining the axes of the main shaft 94 and the particular cogwheel, as shown in Figure 5.

Figure 6:
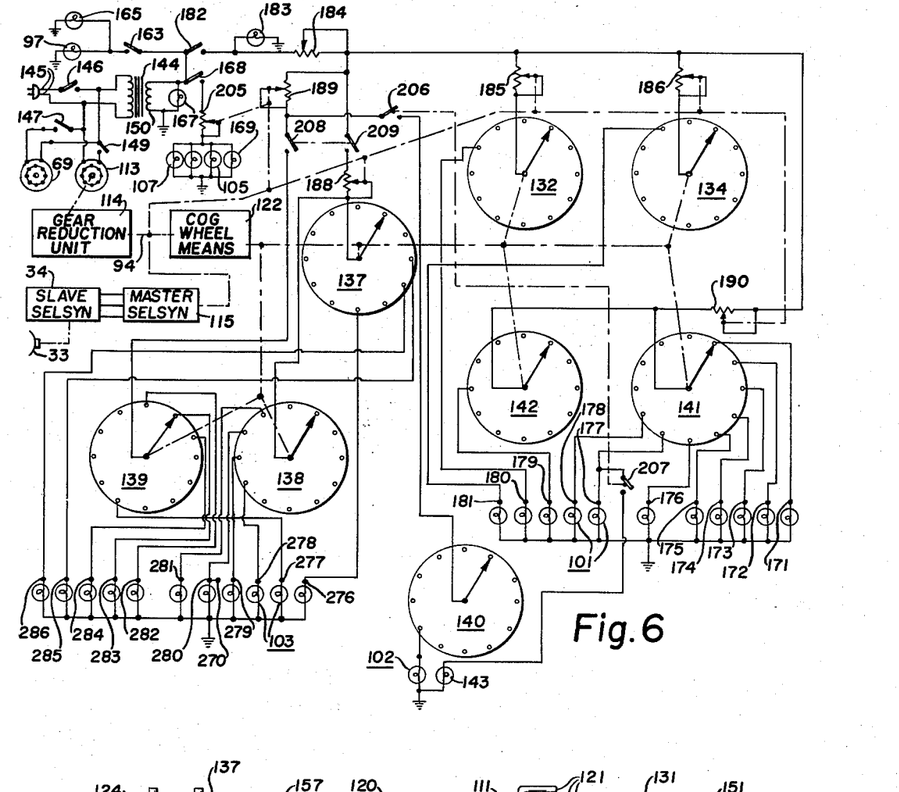
Figure 6 is a schematic diagram of an electrical circuit.
Figure 9:
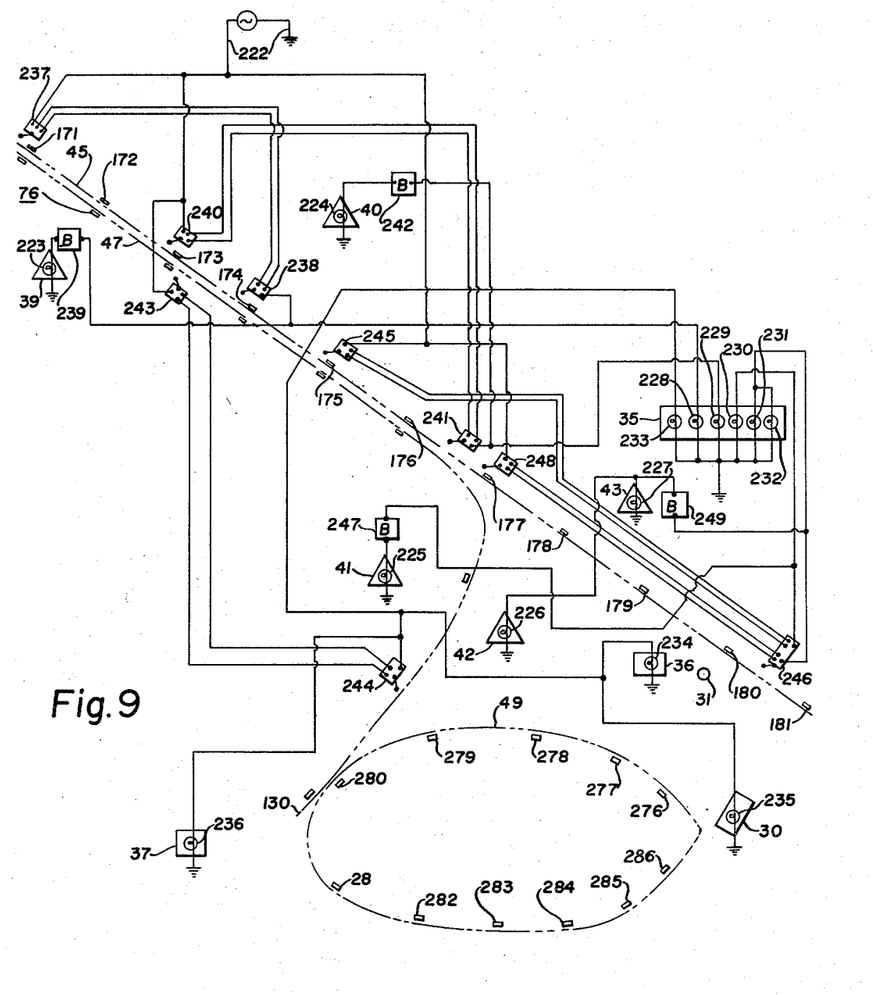
Figure 9 is a plan view of the electrical connections beneath the terrain panel.

The commercial aircraft path 45 will first be described, since it follows a generally straight line and hence is easiest to understand. Figure 9 may be compared with Figure 1 to note that it schematically illustrates the three paths 45, 47 and 49. In the Figure 9 there are eleven locations along the first or commercial aircraft path 45. These locations are designated by contacts 171 through 181, respectively. The location of the radar station 31 has been shown on Figure 9 and the azimuthal direction from the radar station of each of the contacts 171 through 181 bears a direct relation as to which of the twelve contacts of the twelve switches will be connected to a particular contact 171 to 181. The Figure 6 shows schematically the principal electrical diagram and shows that eight switches 132, 134, 137, 138, 139, 140, 141 and 142 are connected in this electric circuit. The switches 132, 134, 141 and 142 are connected to the contacts in the aircraft path 45. Since the actuator arms 121A through 121F are spaced ten degrees apart, they divide each 60 degree sector into 10 degree portions so that the full 360 degree circle around the radar station 31 is divided into 36 sectors of ten degrees each. This means that for each location of an aircraft on the terrain panel 15, there is chosen the appropriate 10 degree sector on the switch means 111 and cogwheel means 122. If a greater number of switches and/or switch actuator arms are used, then the sectors can be made even smaller than ten degrees in width.

The cogwheel 151 and associated switch 131, since they are actuated by actuator arms 121A through 121C, thus control the first three 10 degree sectors starting with zero degrees, ten degrees and twenty degrees. The cogwheel 152, Figure 7, and associated switch 132 control the next three sectors of 30 degrees, 40 degrees and 50 degrees. This continues clockwise around the switches shown in Figure 5 until the twelfth switch 142, coaxially underneath switch 141, and shown in Figure 6, controlled by actuator arms 121D through 121F, controls the sectors 330 degrees, 340 degrees and 350 degrees. The main shaft 94 rotates clockwise as viewed in Figures 5 and 6. The first seven contacts 171 through 177 are all within the 310 degree sector relative to the radar station 31. This means they should be controlled by actuator arm 121B on the eleventh cogwheel 161. Therefore, in the cogwheel 161, the first through seventh cogs 191 through 197 are placed in the intermediate row of holes. These cogs progress numerically on the cogwheel 161 in a clockwise direction, starting with a line joining the axis the main shaft 94 and the axis of the cogwheel 161. The eighth contact 178 is within the 320 degree sector relative to the radar station 31 and hence, the eighth cog 198 is placed on the cogwheel 161 on the innermost row so that it will be actuated by the actuator arm 121C. It is placed on the radial next clockwise after the radial on which the cog 197 is located. The ninth contact 179 is located in the 330 degree sector, hence the corresponding cog 199 is placed on the cogwheel 162 for actuation by the actuator arm 121D. The tenth contact 180 is within the 50 degree sector relative to the radar station 31, and hence the corresponding cog 200 is placed on the cogwheel 152 for actuation by the actuator arm 121F. Similarly, the eleventh contact 181 is in the 110 degree sector and the corresponding cog 201 is placed on the cogwheel 154 for actuation by the actuator arm 121F. This location of the cogs 191 through 201 on the cogwheels 161, 162, 152 and 154 establishes the correct phase relationship between actuation of the corresponding switches so that the contacts 171 through 181 are energized at the correct instant. By using switches each having a greater number of positions, a greater number of contacts 171 to 181 on the terrain panel 15 may be controlled.

The Figure 6 shows the four switches 132, 134, 141 and 142 with the proper switch contact thereof connected to the contacts 171 through 181. Individual lamps of the first line of lamps 101 are connected in parallel with the contacts 171 through 181. This first line of lamps 101 has sequential illumination of the lamps therein so that sequential spots of light appear on the oscilloscope face 95. These spots of light are arranged so that the path or course indicated thereby is identical to the commercial aircraft path 45.

As the switch actuator 120 is rotated at a slow speed by the drive motor 113, each of the cogwheels 151 through 162 is indexed or partially rotated through a 30 degree arc. Figure 5 shows the cogwheels in their initial position ready to start a complete cycle of operation. On the first rotation of the switch actuator 120, the actuator arm 121B engages cog 191 to partially rotate 30 degrees the cogwheel 161. This places the contact finger of the switch 141 in the position shown in Figure 6. The Figure 6 also shows all switches moved to the first position, because of the actuator arm means 121 and the square cogs 129. The circuit of Figure 6 thus shows that electrical energy may flow to the contact 171 and the lamp associated therewith. The oscilloscope face 95 is shown in Figure 10 and the illumination of the lamp connected in parallel with the contact 171 creates a first spot of light 211. This corresponds with the illumination of the lamp 79 in the commercial aircraft 46. The main shaft 94 rotates the trace rod 96 in a clockwise direction, and the trace rod, being illuminated, also moves past the first spot of light 211 at the instant when it appears. This simulates a "blip" as would appear on a conventional oscilloscope tube face. The master selsyn 115 is electrically connected to the slave selsyn 34 which drives the radar antenna 33. This connection of selsyns, with the master selsyn being driven from the main shaft 94, assures that the radar antenna 33 will be pointing at the commercial aircraft 46 at the instant when the lamp 79 in the commercial aircraft 46 is illuminated. Such illumination of the lamp 79 is effected, of course, by the contact finger engaging the contact 171. It will therefore be seen by an observer of the entire demonstration equipment that when the radar antenna 33 is pointing toward an aircraft, the light in such aircraft will be illuminated to give an indication that the radar waves are being reflected from such aircraft, and also a "blip" or spot of light will appear at the appropriate location on the oscilloscope face 95, as shown in Figure 10, as the trace or line of light from the trace rod passes such location. As the switch actuator 120 rotates 360 degrees, the actuator arm 121B engages the cog 192 to rotate the cogwheel 161 another 30 degrees. This moves the contact arm of the switch 141 to the next position to energize the contact 172 and also to energize the lamp paralleled therewith which is in the first line of lamps 101. By this time, the drive motor 69 has moved the commercial aircraft 46 to a point so that the contact finger thereof is in engagement with the next in the series of contacts, namely, contact 172. Hence the lamp 79 is again illuminated and also the next lamp in the first line 101 is illuminated to create a second spot of light 212. This continues for five more rotations of the switch actuator 120 with the cogwheel 161 being indexed 30 degrees for each 360 degree rotation of this switch actuator 120. Between the seventh and eighth cogs 197 and 198, there will be a 370 degree rotation of the switch actuator 120, since cog 197 is actuated by the actuator arm 121B, whereas the cog 198 is actuated by the actuator arm 121C. Since these two actuator arms are spaced ten degrees apart, this means that the ten degrees is added to 360 degrees to produce a 370 degree phase spacing between the successive actuations of the switch 141. This 370 degree phase spacing assures that the antenna 33 is pointed in the direction of the aircraft 46 before the eighth spot of light 218 appears on the oscilloscope face 95. The appropriate delay in phase is achieved between the eighth and ninth cogs, the ninth and tenth cogs and the tenth and eleventh cogs, so that the radar antenna 33 is correctly pointed at the aircraft at the time of the appearance of the corresponding spots of light 219 through 221. The contacts 171 through 181 are also correctly spaced on the terrain panel 15 so that the contact finger 77 will contact the corresponding contact and hence cause illumination of the lamp 79 in the aircraft 46 when the antenna 33 is actually aimed at the aircraft, and hence the sequential illumination of the lamp 79 is synchronized with the appearance of the spots of light 211 to 221 on the oscilloscope face 95. This means that the contacts 178 to 181 have a slightly greater spacing than the contacts 171 to 177, to compensate for the greater phase spacing along the latter portion of the path 45.

The Figure 6 shows the complete circuit for energizing the switches 131 to 142. A transformer 144 is energized from power leads 145 through a main switch 146. The main switch 146 also energizes the drive motor 69 and the drive motor 113. A separate switch 147 controls the drive motor 69 and a switch 149 controls the drive motor 113. Normally both switches 147 and 149 are closed before the main switch 146 is closed. The closing of the switch 146 causes both motors 69 and 113 to start to run so that they stay in synchronism. If one of the motors gets slightly ahead of the other motor, due to the difference in load, for example, then its respective switch may be opened momentarily to restore synchronism. The leads to the drive motor 69 go through the interconnection means 17 from the oscilloscope panel 16 to the terrain panel 15. A secondary 150 is provided on the transformer 144. This provides low voltage energization for the switch means 111 and associated lamps. The secondary 150 has one end grounded and the other end goes through a trace switch 163 on the control panel 164 of the oscilloscope housing 16, as shown in Figure 2. The trace switch 163 provides illumination of a trace indicator lamp 165 on the control panel 164 and also provides illumination for the trace lamp 97 which is located at the outer end of the trace rod 96.

The main switch 146 is located on a power control panel 166 on the oscilloscope panel 16 and this causes illumination of an indicator lamp 167 also located on the panel 166 and energized from the secondary 150. The switches 147 and 149 may also be located on the panel 166.

A permanent echo switch 168 is also located on the control panel 164. This causes illumination of an indicator lamp 169 on the control panel 164 and illumination of the plurality of lamps 107. These lamps 107 are carried on the second frame 92 and transmit light by the translucent rods 108 to the oscilloscope face 95 to cause a spot of light such as the spot 170. These rods and lamps are appropriately placed to indicate permanent echoes, such as by the ridge 27 or municipality 22. The lamps 105, which simulate ground clutter, such as caused by the altering headquarters 36, are also controlled by switch 168.

A target switch 182 and indicator lamp 183 are also located on the control panel 164 and this switch causes illumination of the indicator lamp 183. A manually adjustable potentiometer 184 is also located on the control panel 164 and is available to control the intensity of the "blips" on the oscilloscope face 95. Each of the switches 131 through 142 are connected to the potentiometer 184.

The potentiometer means 112 includes in this case six separate potentiometers 185 through 190 driven from the main shaft 94. These six potentiometers are each located in a different 60-degree sector to control the illumination of the "blips" in that particular sector. The first potentiometer 185 is connected between the potentiometer 184 and the switch 132 since this switch 132 is in the first 60-degree sector. The second potentiometer 186 is connected between the potentiometer 184 and the switch 134 since this switch is in the second 60-degree sector. The third potentiometer 187 is not utilized in this particular circuit since the switches 135 and 136 are not in use. The fourth potentiometer 188 is connected between the potentiometer 184 and the seventh and eighth switches 137 and 138 since these switches are both within the fourth 60-degree sector. The fifth potentiometer 189 is connected between the potentiometer 184 and the ninth switch 139, and the sixth potentiometer 190 is connected between the potentiometer 184 and the eleventh and twelfth switches 141 and 142. The Figure 8 shows the potentiometer 185 which is illustrative of all six potentiometers. This potentiometer 185 has a movable contact finger 202 and first and second end connections 203 and 204. Preferably the arcuate spacing between the end connections 203 and 204 is about 55 or 60 degrees. This assures that the spot of light on the oscilloscope face 95 will be extinguished during the last 55 or 60 degrees of movement, and more particularly to assure that a particular lamp in the line of lamps 101, 102 or 103 will not be initially illuminated except at or near its full brightness, such as when the contact finger 202 is in the position as shown in Figure 8.

The Figure 6 also shows schematically that the drive motor 113 drives the main shaft 94 through the gear reduction unit 114 which drives the several potentiometers in the potentiometer means 112. Also the cogwheel means 122 has been schematically shown on Figure 6 to illustrate that the various switches 131 through 142 are driven by this cogwheel means 122. A potentiometer 205 is also driven from the main shaft 94 and is similar in construction to that shown in Figure 8 so that the permanent echoes and ground clutter will also have a fading characteristic. This rotation of the potentiometer means 112 in correct synchronism and phasing with the switch means 111 assures that the various "blips" simulate the phosphorescence qualities of an actual oscilloscope tube face.

An unidentified aircraft switch 206 is also provided on the control panel 164 to control the blips of the unidentified aircraft path. This switch 206 has an auxiliary contact 207 to control the energization of the lamp 143 which indicates the seventh position of the unidentified aircraft and the main switch 206 controls the eighth position by way of the switch 140. Thus the lamp 143 is also in the second line of lamps 102.

Interconnected interceptor aircraft switches 208 and 209 control energization to the switches 137, 138 and 139 and a control switch 210 therefor, shown in Figure 3, is also located on the control panel 164. When these switches 208 and 209 are opened, then there will not appear on the oscilloscope face 95 any blips corresponding to the interceptor aircraft 50.

The Figure 6 shows that the switches 137, 138 and 139 are used to control the path of the interceptor aircraft 50 in a manner similar to that shown for the control of the commercial aircraft 46. The interceptor aircraft path 49 lies within the sectors 190 degrees to 260 degrees, relative to the radar station 31, and hence these sectors are controlled by the switches 137, 138 and 139. The unidentified aircraft path 47 is controlled principally by the tenth switch 140 and also in effect by some of the switches used to control the commercial aircraft path 45. The unidentified aircraft path 47 has purposely been chosen as flying parallel to and closely adjacent the commercial aircraft path to simulate the fact that an unidentified or hostile aircraft might fly close to a commercial aircraft flying along a commercial air lane in order to attempt to escape detection. At about a midpoint of the commercial aircraft path 45 shown on the terrain panel 15, the unidentified aircraft 48 makes a quick right turn while diving down and flies up the valley 25 toward the bridge 28. Its apparent mission is to destroy this bridge 28. This path of the unidentified aircraft 48, it will be noted, lies hidden from the radar station 31 because of the ridge 27. Therefore, the radar station will possibly only pick up or detect the unidentified aircraft in the eighth position thereof shown as a spot of light 148. The seventh position of the unidentified aircraft 48 may also have diverged from the path of the commercial aircraft 46, and this may be illustrated by a separate lamp 143 connected in parallel with the seventh lamp on the line 101, shown on Figure 6.

The lamp 143 provides a spot of light 210 on the oscilloscope face, as shown in Figure 10, but this spot of light is closely adjacent the spot of light 217 caused by the commercial aircraft 46, hence a radar operator could easily overlook such danger signal. The ridge 27 may or may not hide the unidentified aircraft 48 from the radar station 31 in the eighth position of the aircraft, however, for training or demonstration purpose, the switch 140 causes energization of a lamp in the line of lamps 102 to cause the eighth spot of light 148 on the oscilloscope face as shown in Figure 10. The tenth position of the unidentified aircraft 48 may also appear on the oscilloscope face as a spot of light 250, and also the lamp 74 in the unidentified aircraft 48 may be illuminated at this time by the appropriate placing of a contact on the terrain panel 15. The circuit arrangement for this tenth position may conveniently be taken care of by the interceptor aircraft 50, as hereinafter described.

For the first portion of the unidentified aircraft path 47, since the unidentified and commercial aircrafts 46 and 48 are so close together, the blip from each of the two aircraft will appear on the oscilloscope face 95 as a single blip. This means that the radar operator watching the oscilloscope face 95 would not normally be aware that there were two aircraft closely adjacent because the slightly larger blip would not be noticeable, there being nothing with which the observer could compare it at that moment. This emphasizes the importance of the ground observers in the observer posts 39 and 40. The ground observer at the post 39 would be the first one to see the commercial aircraft 46 and also to see that an unidentified aircraft 48 is flying closely adajacent thereto. He would telephone this information to the filter center 35. The standard operating procedure of such filter center would normally be that a single ground observer noting an unidentified aircraft would not cause any undue alarm. However, when the ground observer at the post 40 also reported that he also saw an unidentified aircraft closely adjacent the commercial aircraft 46, when the red alert would be sounded. This would be passed by the filter center 35 to the aircraft controller and the interceptor aircraft 50 would be order to take off to investigate the unidentified aircraft 48. The radar station 31 would pick up the interceptor aircraft shortly after it rose from the ground and hence the interceptor aircraft 50 has been shown as appearing first when the commercial and unidentified aircraft are at the sixth position thereof. The aircraft controller would vector the interceptor aircraft 50 to an interception with the unidentified aircraft which presumably is attempting to destroy the bridge 28. Since the radar equipment at the radar station 31 cannot pick up the path of the unidentified aircraft 48 after it disappears behind the ridge 27, the ground observers in the posts 41 and 42 become quite important to pass informaiton to the filter center 35 so that the aircraft controller knows the path of the unidentified aircraft 48. The aircraft controller can direct or vector the interceptor aircraft to an interception at about the tenth position of the interceptor aircraft 50 and presumably the unidentified aircraft is shot down and disappears at the point 130. The point 130 designates a hole in the terrain panel 15 through which the unidentified aircraft 48 descends because of the end bend 66 in the guide tube 56. The interceptor aircraft 50 continues around and lands at the airfield 30.

The Figures 1, 3, 5, 6, 9 and 10 further illustrate the operation of the interceptor aircraft 50. As shown in Figure 1, the interceptor aircraft 50 starts at the airfield 30, and is guided in a closed loop by the guide tube 54. At about the fifth position of the commercial and unidentified aircraft, the finger 75 of the unidentified aircraft actuates a switch 266, shown on Figure 3. The switch 110 is normally closed during operation to energize the relay 267, which closes contacts 268 thereon and starts the drive motor 82. Potentiometers 269 and 270 govern the minimum and maximum speeds of the motor 83. The rheostat 83 is driven at one revolution for each complete circuit of the interceptor aircraft 50. As shown in Figure 3, the rheostat 83 is in the position of maximum resistance at the beginning and ending of the flight of the interceptor aircraft 50, and is in the position of minimum resistance at the midpoint of the flight of the aircraft 50. This permits the speed of the aircraft 50 to vary from slow to fast to slow again to simulate takeoff, interception and landing. Also the guide tube 54 changes elevation so that the aircraft, on its wire supports, rests on the airfield 30, rises into the air to clear the ridge 27, dives down for the interception with the unidentified aircraft 48, and then rises and again descends for a landing.

The Figure 6 shows that switches 137, 138 and 139 control the energization of the lamp 80 in the interceptor aircraft 50 by energizing the appropriate contacts along the path thereof, and control the lamps in the line 103 for the oscilloscope face 95.

As previously stated, the switch 266 is actuated by the unidentified aircraft 48 at about the fifth position thereof to start the interceptor aircraft 50 on its path. The interceptor aircraft 50 rises from the airfield 30, and is first observed by the radar station 31, at a position corresponding to the sixth position of the commercial and unidentified aircraft. Actually eleven positions for the interceptor aircraft 50 have been shown, and are called the sixth through sixteenth positions with corresponding contacts 276 through 286, for ease of comparison with the positions of the commercial and unidentified aircraft. These contacts 276 through 286 are appropriately spaced along the interceptor aircraft path 49 to cause illumination of the lamp 80. The sixth contact 276 is controlled by the sixth position of the seventh switch 137, since the aircraft 50 at that time is in the 200 degree sector. The line of lamps 103 provide appropriate spots of light 296 through 306 on the oscilloscope face shown in Figure 10. The tenth contact 280 may be electrically connected to a separate contact 270, placed along the unidentified aircraft path 47, to cause illumination of the lamp 74 in the unidentified aircraft 48 for the tenth position of this aircraft, which will correspond with the spot of light 250 on the oscilloscope face 95.

The terrain panel 15 also contains further indicator lamps of particular interest to the ground observer personnel. Blinking lamps are provided in each of the ground observer posts 39 through 43 as well as indicator lamps being provided in the filter center 35, alerting headquarters 36, antiaircraft radar headquarters 37, and the airfield 30. The Figure 9 particularly shows the electrical switches in connection with these indicator lamps as they are controlled by the movement of the aircraft on the terrain panel 15.

The first, second and third paths 45, 47 and 49 are shown on Figure 9. The commercial aircraft 46 has the extending contact finger 77 which is adapted to contact the several contacts 171 through 181 to cause illumination of the lamp 79 in the aircraft 46. This contact finger 77 also is adapted to engage and actuate a plurality of switches as shown in Figure 9. Low voltage power leads 222 are provided on the terrain panel 15 and originate from the transformer secondary 150 by passing through the interconnection means 17. Lamps 223 to 227, inclusive, are provided in the ground observer posts 39 to 43, respectively. Also, white lamps 228 through 232 are provided in the filter center 35. A red lamp 233 is also provided in the filter center 35. Red lamps 234 through 236 are provided in the alerting headquarters 36, the airfield 30 and the anti-aircraft headquarters 37, respectively.

Several switches lie along side the path 45 to be actuated by the contact finger 77. Switches 237 and 238 are interconnected and are double-throw switches to control the lamp 223 through a blinker 239. This blinker causes the lamp 223 in the ground observer post 39 to blink on and off. This gives an indication to observers watching the terrain panel 15 that the ground observer in the post 39 has observed the commercial aircraft 46, and/or the unidentified aircraft 48, should it be flying adjacent the commercial aircraft 46. The switches 237 and 238 also control energization of the white lamp 228 in the filter center 35, which indicates that the ground observer has telephoned his report to the filter center. When the commercial aircraft has travelled along the path 45 to the point whereat the switch 238 is actuated, the lamps 223 and 228 will be extinguished. This indicates that the ground observer in the post 39 can no longer see the commercial aircraft.

Switches 240 and 241 control the actuation of the lamp 224 at the position 40 through the blinker 242, and also simultaneously causes illumination of the lamp 229. Since an unidentified aircraft accompanies the commercial aircraft on alternate runs across the terrain panel 15, when the unidentified aircraft is traversing the board, then the contact finger 75 on the unidentified aircraft support actuates a switch 243. This switch, plus a switch 244, control the energization of the red lamp 233 at the filter center 35. This symbolizes a red alert. Simultaneously this red alert is passed to the alerting headquarters 36, to the airfield 30, and the anti-aircraft headquarters 37, and indicated by the red lamps being illuminated at these locations. This simulates the typical operating procedure wherein a red alert is not called when only a single ground observer post reports an unidentified aircraft, yet when two such ground observer posts report the unidentified aircraft, then the red alert is given. The interceptor aircraft 50 is then ordered to take off to investigate. The ground observers in the posts 41 and 42 play an important part in the detection and tracking of the unidentified aircraft since it flies up the valley between these two posts, and is hidden from the radar station 31.

The switches 245 and 246 control the energization of the lamp 225 in the ground observer post 41 through the blinker 247 and also cause energization of the corresponding lamp 230 in the filter center 35. This indicates that the ground observer at the post 41 has observed the commercial and/or unidentified aircraft when they have reached this point on their paths. The switch 248, together with the multiple pole switch 246, control the lamps 226 and 227 through the blinker 249 since it may be assumed that personnel in both of these posts observe the aircraft at about the same time. Lamps 231 and 232 are thus simultaneously illuminated at the filter center 35. The switch 246 extinguishes all lamps 225, 226, 227, 230, 231 and 232 just before the commercial aircraft 46 goes off the edge of the terrain panel 15. This conditions the electrical circuit in readiness for the next cycle of operation. The red alert actually stays on for some time after the unidentified, or hostile, aircraft is shot down, and hence the switch 244, which turns off all red lamps, has been placed along side the lower run of the guide tube 56, as shown in Figure 3. When the unidentified aircraft 48 reaches this point in its path, it actuates the switch 244 to extinguish the red lamps, thus conditioning these lamps for the next cycle of operation.

The switches 135 and 136 are not used, nor is the potentiometer 187, in this particular illustration because none of the aircraft paths go into the third 60 degree sector. Cogs, therefore, need not be provided on the cogwheels actuating such switches, since there is no need to index these switches. The switches and potentiometers are provided, however, in order to show that all 60 degree sectors may be controlled, and to provide uniformity between successive oscilloscope housings, so that such housings may be electrically connected to and used with a different terrain panel having different aircraft paths thereon. In such case new active cogs 125, 126 and 127 may be inserted in the appropriate holes in the cogwheel means, and the appropriate switch contacts wired into the new circuit.

The terrain panel 15 of Figure 1 may be considered to have north at the top of Figure 1, to correspond to the oscilloscope face 95. To obtain other directions of paths, for demonstration and/or training purposes, the terrain panel 15 may be placed in another position, e.g., the right edge of the terrain panel may be moved to face north. The manual handwheel 117 may then be rotated to rotate all frames 91, 92 and 93, as a unit, 90 degrees counterclockwise. The main shaft 94 remains stationary relative to the chassis 89 during this shifting movement, and hence the switch means 111 and potentiometer means 112 are correctly shifted to the new phase condition. The oscilloscope panel 16, by itelf, may also be used to train radar operating personnel, and as such the handwheel 117 is useful to change the direction of the paths, so that such operating personnel may gain practice in observing and communicating spots of light or blips at any and all azimuthal directions and ranges.

The Figure 11 illustrates a modified terrain panel 255. On this panel a series of small aircraft 256 are mounted on the short poles 257. Indicator lamps 258 may be provided in each of the aircraft 256 and these lamps may be illuminated sequentially in accordance with the energization of the contacts 171 through 181 in order to simulate the speed, direction and altitude of an aircraft path on the terrain panel 255. By this modification, the drive motors 69 and 82 are not required, hence the terrain panel 255 is simpler to construct and still the aircraft paths are simulated by lamp means illuminable at spaced intervals therealong.

The Figure 12 illustrates a portion of a modified electrical circuit 260 which may be substituted for that portion shown in the upper left portion of Figure 6. This modified electrical circuit 260 includes a synchronous motor 261 to drive the aircraft 46 and 48 and the radar antenna 33 on the terrain panel 15, and includes a synchronous motor 262 to drive the main shaft 94.

A synchronous motor 263 energized through the relay contacts 268 drives a cam 264, in turn controlling a variable speed drive 265 to drive the sprocket wheel 81 for the interceptor aircraft 50. The variable speed drive 265 varies the speed of the interceptor aircraft 50 in a manner similar to the rotation of the rheostat 83 in the preferred circuit of Figure 3. The energization for the synchronous motors 261 and 263 is provided by conductors within the interconnection means 17 so that the oscilloscope panel 16 retains the master control.

The drive motor 69 synchronizes the movements of the two commercial aircraft 46 with the movement of the single unidentified aircraft 48. The movement of the unidentified aircraft 48 synchronizes the movement of the interceptor aircraft 50 therewith since the contact finger 75 of the unidentified aircraft 48 is that which initiates and terminates the movements of the interceptor aircraft 50. In the oscilloscope housing 16 in the main shaft 94 synchronizes the three paths of courses as shown on the oscilloscope face 95 by means of the first, second, and third lines of lamps 101, 102, and 103. The switch means 111 and the cog wheel means 122 synchronize the illumination of the lines of lamps 101, 102, and 103 with the lamp means 74, 79, and 80, or the lamp means 258, as being illuminable at spaced intervals. Also, since the master selsyn 115 is driven directly from the main shaft 94, the radar antenna 33 is synchronized with the movement of the switch means 111. Also, in this connection, as best shown on Figure 9, the contacts on the terrain panel 15, such as the contacts 171 through 181, are elongated along the direction of the corresponding path. The purpose of making these contacts elongated is to make sure that the respective contact finger 77 will be touching such contact at the instant that the switch means 111 causes energization of that particular contact, and to maintain energization of such contact 171 through 181 for a short length of time so that the lamp 79 will be illuminated for a correspondingly short period of time which is synchronized with the radar antenna 33 being aimed at such aircraft. The same synchronization between the oscilloscope 16 and terrain panel 15, with the oscilloscope 16 retaining the master control, is achieved in the modified circuit shown in Figure 12.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Simulated reflected wave demonstration equipment, comprising a map panel; and means simulating an oscilloscope and interconnecting means therebetween; said map panel including a surface of typical terrain, means simulating a rotatable reflected wave antenna on said map, drive means to rotate said simulated antenna, a first path of a movable object located on said map, first electrical means to indicate the direction and speed of a movable object on said path; said means simulating an oscilloscope including a housing, a face in said housing which is at least translucent simulating an oscilloscope tube face, second electrical means cooperating with said face and arranged to indicate a course thereon corresponding to said path, said second electrical means sequentially producing spots of light on said face to indicate the travel of said movable object progressively along said course; and said interconnecting means including first means to synchronize said drive means with said second electrical means and second means to synchronize said first and second electrical means.

2. Simulated radar demonstration equipment, comprising a terrain panel; means simulating an oscilloscope and interconnecting means therebetween; said terrain panel including a map of typical terrain, an aircraft path located on said map, first electrical means to indicate the direction, speed and altitude of simulated aircraft on said path; said simulated oscilloscope including a housing, a face in said housing which is at least translucent simulating an oscilloscope tube face, second electrical means cooperating with said face and arranged to indicate a course thereon corresponding to said path, said second electrical means sequentially producing spots of light on said face to indicate the travel of simulated aircraft progressively along said course; and said interconnecting means including means to synchronize said first and second electrical means.

3. Simulated radar demonstration equipment, comprising a terrain panel; means simulating an oscilloscope and interconnecting means therebetween; said terrain panel including a map of typical terrain, means simulating a rotatable radar antenna on said map, drive means to rotate said simulated antenna, an aircraft path located on said map, first electrical means to indicate the direction, speed and altitude of simulated aircraft on said path; said simulated oscilloscope including a housing, a face in said housing which is at least translucent simulating an oscilloscope tube face, second electrical means cooperating with said face arranged to indicate a course thereon corresponding to said path, said second electrical means sequentially producing spots of light on said face to indicate the travel of simulated aircraft progressively along said course; and said interconnecting means including first means to synchronize said drive means with said second electrical means, and second means to synchronize said first and second electrical means.

4. Simulated radar demonstration equipment, comprising a terrain panel, means simulating an oscilloscope and interconnecting means therebetween; said terrain panel including a map of typical terrain, means simulating a rotatable radar antenna on said map, first electrical drive means to rotate said simulated antenna, first and second simulated aircraft paths located on said map, first and second electrical means to indicate, respectively, the direction and altitude of said paths and speed of simulated aircraft thereon, and first means to synchronize said first and second electrical means; said means simulating an oscilloscope including a housing, a face in said housing which is at least translucent simulating an oscilloscope tube face, third and fourth electrical means cooperating with said face and arranged to indicate paths thereon corresponding to said first and second paths, electrical switch means second electrical drive means to drive said switch means to sequentially actuate each of said third and fourth electrical means to indicate the travel of simulated aircraft progressively along each of said paths, variable resistor means connected to said third and fourth electrical means to simulate phosphorescence in said simulated oscilloscope face, second means to synchronize said third and fourth electrical means, and third means to synchronize said variable resistor means with said third and fourth electrical means; and said interconnecting means including fourth means to synchronize said first and second drive means, and fifth means to synchronize said first and second electrical means with said third and fourth electrical means to correlate the indicated movement on the paths of said terrain panel in accordance with the indicated movement on said simulated oscilloscope face.

5. Simulated reflected wave demonstration equipment, comprising a terrain panel, means simulating an oscilloscope and interconnecting means therebetween; said terrain panel including a map of typical terrain, means simulating a reflected wave station located on said map, means simulating reflected wave antenna at said station, first and second movable object paths located on said map, first electrical means to indicate the direction of said paths and speed of objects thereon, respectively; said simulated oscilloscope including a housing, a face in said housing which is at least translucent simulating an oscilloscope tube face, illuminable means rotatable as a trace line on said face, first and second sets of lamp means behind said face and mounted to illuminate same, said first and second lamp means being arranged to correspond to said first and second paths, second electrical drive means to rotate said illuminable means, electrical switch means driven by said second drive means to sequentially illuminate the lamp means in each of said first and second sets to indicate the travel of objects progressively along each of said paths, and variable resistor means driven by said second drive means to progressively dim each of said lamp means after illumination thereof; and said interconnecting means including connector means between said first and second sets of lamps and said first electrical means to correlate the indicated movement on the paths of said terrain panel in accordance with the illuminated ones of said lamp means.

6. Simulated radar demonstration equipment, comprising a terrain panel, means simulating an oscilloscope and interconnecting means therebetween; said terrain panel including a map of typical terrain, means simulating a radar station located on said map, means simulating a rotatable antenna at said station, electrical drive means to rotate said simulated antenna, means simulating unidentified and intercept aircraft paths located on said map, first electrical means to indicate the direction and altitude of said paths and speed of simulated aircraft thereon, respectively; said simulated oscilloscope including a housing, a face in said housing which is at least translucent simulating an oscilloscope tube face, illuminable means rotatable as a trace line on said face, first and second sets of lamp means behind said face and mounted to illuminate same, said first and second lamp means being arranged to correspond to said first and second paths, second electrical drive means to rotate said illuminable means, electrical switch means driven by said second drive means to sequentially illuminate the lamp means in each of said first and second sets to indicate the travel of simulated aircraft progressively along each of said paths, and variable resistor means driven by said second drive means to progressively dim each of said lamp means after illumination thereof; and said interconnecting means including first connector means between said first and second drive means for synchronization thereof, and second connector means between said first and second sets of lamps and said first electrical means to correlate the indicated movement on the paths of said terrain panel in accordance with the illuminated ones of said lamp means.

7. Simulated radar demonstration equipment, comprising a terrain panel, means simulating an oscilloscope and interconnecting means therebetween; said terrain panel including a three dimensional relief map of typical terrain, means simulating a radar station located on said map, means simulating a rotatable antenna at said station, electrical drive means to rotate said simulated antenna, means simulating commercial, unidentified and intercept aircraft paths extending across said map, first, second, and third electrical means to indicate the direction and altitude of said paths and speed of simulated aircraft thereon, respectively; said simulated oscilloscope including a housing, a face in said housing which is at least translucent simulating an oscilloscope tube face, illuminable means rotatable as a trace line on said face, first, second, and third sets of lamp means behind said face and mounted to illuminate same, said first, second and third lamp means being arranged to correspond to said first, second, and third paths, second electrical drive means to rotate said illuminable means, electrical switch means driven by said second drive means to sequentially illuminate the lamp means in each of said first, second, and third sets to indicate the travel of simulated aircraft progressively along each of said paths, and variable resistor means driven by said second drive means to progressively dim each of said lamp means after illumination thereof; and said interconnecting means including first connector means between said first and second drive means for synchronization thereof, and second connector means between said first, second, and third sets of lamps and said first, second, and third electrical means to correlate the indicated movement on the paths of said terrain panel in accordance with the illuminated ones of said lamp means.

8. Simulated radar demonstration equipment, comprising, a terrain panel; means simulating an oscilloscope and interconnection means therebetween; said terrain panel including a map of sample terrain, an aircraft path traversing said map, first lamp means illuminable at spaced intervals to indicate the direction, speed, and altitude of simulated aircraft on said path, means simulating a radar antenna on said map, and electrical drive means to rotate said simulated antenna; said simulated oscilloscope including a housing, an oscilloscope face in said housing at least translucent representing the face of an oscilloscope tube, second lamp means arranged behind said face to illuminate same at least in spots of light, switch means to sequentially actuate said second lamp means to indicate on said face the progress of said simulated aircraft along the path thereof, second electrical drive means to drive said switch means, and means to simulate phosphorescence on said oscilloscope face; and said interconnection means including connection means between said first and second lamp means to illuminate at said spaced intervals said first lamp means.

9. Simulated radar demonstration equipment, comprising, a terrain panel; means simulating an oscilloscope and interconnection means therebetween; said terrain panel including a map of sample terrain, an aircraft path traversing said map, first lamp means illuminable at spaced intervals to indicate the direction, speed, and altitude of simulated aircraft on said path, means simulating a radar antenna on said map, and electrical drive means to rotate said simulated antenna; said simulated oscilloscope including a housing, an oscilloscope face in said housing at least translucent representing the face of an oscilloscope tube, second lamp means arranged behind said face to illuminate same at least in a row of spots of light, an illuminable rotatable trace element generally radially disposed on said face, second electrical drive means to rotate said trace element, switch means driven by said second drive means to sequentially actuate said second lamp means to indicate on said face the progress of said simulated aircraft along the path thereof, and variable resistor means driven by said second drive means to progressively dim the lamp means of said second lamp means after illumination thereof; and said interconnection means including first connection means between said first and second drive means for synchronization thereof, and second connection means between said first and second lamp means to illuminate at said spaced intervals said first lamp means.

10. Simulated radar demonstration equipment, comprising, a terrain panel; means simulating an oscilloscope and interconnection means therebetween; said terrain panel including a map of sample terrain, first and second aircraft paths traversing said map, first and second lamp means illuminable at spaced intervals to indicate the direction, speed, and altitude of simulated aircraft on each of said paths, means simulating a radar antenna on said map, and electrical drive means to rotate said simulated antenna; said simulated oscilloscope including a housing, an oscilloscope face in said housing at least translucent representing the face of an oscilloscope tube, third and fourth lamp means arranged behind said face to illuminate same at least in rows of spots of light, an illuminable rotatable trace element generally radially disposed on said face, second electrical drive means to rotate said trace element, switch means driven by said second drive means to sequentially actuate the lamp means of said third and fourth lamp means to indicate on said face the progress of said first and second simulated aircraft along their respective paths, and variable resistor means driven by said second drive means to progressively dim each of the lamp means of said third and fourth lamp means after illumination thereof; and said interconnection means including first connection means between said first and second drive means for synchronization thereof, and second connection means between said first and second lamp means and said third and fourth lamp means, respectively, to illuminate at said spaced intervals said first and second lamp means.

11. Simulated radar demonstration equipment, comprising, a terrain panel; means simulating an oscilloscope and interconnection means therebetween; said terrain panel including a three dimensional relief map of sample terrain, first, second, and third aircraft paths traversing said map, first, second, and third lamp means illuminable at spaced intervals to indicate the direction, speed, and altitude of simulated aircraft on each of said paths, means simulating a radar antenna on said map, and electrical drive means to rotate said simulated antenna; said simulated oscilloscope including a housing, an oscilloscope face in said housing at least translucent representing the face of an oscilloscope tube, fourth, fifth, and sixth lamp means arranged behind said face to illuminate same at least in rows of spots of light, an illuminable rotatable trace element generally radially disposed on said face, second electrical drive means to rotate said trace element, switch means driven by said second drive means to sequentially actuate the lamp means of said fourth, fifth, and sixth lamp means to indicate on said face the progress of said first, second, and third simulated aircraft along their respective paths, and variable resistor means driven by said second drive means to progressively dim each of the lamp means of said fourth, fifth, and sixth lamp means after illumination thereof; and said interconnection means including first connection means between said first and second drive means for synchronization thereof, and second connection means between said first, second, and third lamp means and said fourth, fifth, and sixth lamp means, respectively, and excluding said variable resistor means to illuminate only momentarily at said spaced intervals said first, second, and third lamp means.

12. Simulated radar demonstration equipment, comprising a terrain panel and means simulating an oscilloscope and interconnection means therebetween; said terrain panel including a three dimensional relief map to scale of a typical sample terrain, means simulating a radar station on said map, means simulating a rotatable antenna at said radar station, a slave selsyn motor to drive said rotatable simulated antenna, means simulating an air field on said map, a first transverse flight path on said map of a simulated commercial aircraft, a second transverse flight path of a simulated unidentified aircraft on said map, an intercept flight path on said map of a simulated interceptor aircraft based on said airfield, said intercept path originating from said airfield and converging on said unidentified aircraft path within the confines of said map, each of said paths being indicated at least partially by lamp means illuminable at spaced intervals therealong, said illuminable spaced intervals of said paths having direction, height and spacing to indicate course, altitude and speed of the aircraft simulated thereby, said intercept path converging on said unidentified aircraft path and corresponding in altitude thereto, said means simulating an oscilloscope including a transparent mask, concentric circles scribed on said mask indicating range of said simulated radar station, azimuth marks scribed on said mask, a rotatable translucent simulated oscilloscope face behind said mask, a transparent plastic trace rod generally radially disposed on said mask and rotatable therewith, a trace lamp mounted at one end of said trace rod for illumination thereof to indicate the aimed direction of said simulated radar antenna, a first frame, a main shaft journalled in said frame generally coaxially behind said rotatable face and connected thereto for simultaneous rotation, a motor and speed reduction unit connected to drive said main shaft at a predeterminable low rate of speed in the range of 1 to 10 r.p.m., a rotatable switch actuator driven from said main shaft, a plurality of multi-position switches, rotatable cog wheel means connected to said switches and having multiple cogs thereon and engageable individually by said switch actuator to partially rotate each of said wheels a fraction of a revolution corresponding to the inverse of the number of positions on one of said multiposition switches for each revolution of said switch actuator, said first frame rotatably mounting said cog wheel means and multi-position switches, a second frame, a plurality of potentiometers mounted on said second frame, gearing interconnecting said main shaft and said potentiometers in a 1:1 ratio; said second frame carrying a plurality of lamps arranged in a first line corresponding to the direction and spacing of said commercial aircraft path on said terrain panel, a third frame carrying transparent plastic rods with a first end thereof adjacent said line of lamps to transmit light therefrom to said translucent face, an electrical circuit including said first line of lamps and a pair of power leads, first conductor means interconnecting said switches with said first line of lamps in said simulated oscilloscope, means for connecting said potentiometers in series with said first line of lamps and to said power leads to give a fading effect of the illumination of said lamps as said main shaft rotates, a second line of lamps carried on said second frame and corresponding to the direction and spacing of said intercept path on said terrain panel, second conductor means interconnecting said switches with said power leads and potentiometers and said second line of lamps in said simulated oscilloscope, at least one lamp in a third line on said second frame indicating part of the path of said simulated unidentified aircraft, third conductor means interconnecting at least one of said switches and potentiometers and said power leads with said lamp in said third line, a master selsyn rotated in synchronism with said main shaft, and connection means to energize said trace lamp from said power leads; and said interconnection means including, fourth conductor means connected in parallel with said first line of lamps to effect the indication of said commercial aircraft path on said terrain panel by the illumination of said lamp means thereof at said illuminable spaced intervals, fifth conductor means connected in parallel with said second line of lamps to effect the indication of said intercept path on said terrain panel by the illumination of said lamp means thereof at said illuminable spaced intervals, sixth conductor means connected in parallel with said lamp in said third line to effect at least partial indication of said unidentified aircraft path on said terrain panel by the illumination of said lamp means thereof, and seventh conductor means electrically connecting said master selsyn to said slave selsyn to cause rotation thereof in synchronism with said trace rod.

13. Simulated radar demonstration equipment, comprising a terrain panel and means simulating an oscilloscope and interconnection means therebetween; said tertrain panel including a three dimensional relief map to scale of a typical sample terrain, means simulating a radar station on said map, means simulating a rotatable antenna at said radar station, a slave selsyn motor to drive said rotatable simulated antenna, means simulating an air field on said map, a first transverse flight path on said map of a simulated commercial aircraft, a second transverse flight path of a simulated unidentified aircraft on said map, an intercept flight path on said map of a simulated interceptor aircraft based on said airfield, said intercept path originating from said airfield and converging on said unidentified aircraft path within the confines of said map, each of said paths being indicated at least partially by lamp means illuminable at spaced intervals therealong, said illuminable spaced intervals of said paths having direction, height and spacing to indicate course, altitude and speed of the aircraft simulated thereby, said intercept path converging on said unidentified aircraft path and corresponding in altitude thereto, said means simulating an oscilloscope including a transparent mask, concentric circles scribed on said mask indicating range of said simulated radar station, azimuth marks scribed on said mask, a rotatable translucent simulated oscilloscope face behind said mask, a transparent plastic trace rod generally radially disposed on said mask and rotatable therewith, a trace lamp mounted at one end of said trace rod for illumination thereof to indicate the aimed direction of said simulated radar antenna, a first frame, a main shaft journalled in said frame generally coaxially behind said rotatable face and connected thereto for simultaneous rotation, a motor and speed reduction unit connected to drive said main shaft at a predeterminable low rate of speed in the range of 1 to 10 r.p.m., a rotatable switch actuator driven from said main shaft, a plurality of multi-position switches, rotatable cog wheel means connected to said switches and having multiple cogs thereon and engageable individually by said switch actuator to partially rotate each of said wheels a fraction of a revolution corresponding to the inverse of the number of positions on one of said multi-position switches for each revolution of said switch actuator, said switch actuator having at least first, second, and third actuator arms of increasing height and length, said cog wheel means having first, second, and third sets of cam pins thereon respectively engageable by said first, second, and third actuator arms, said cam pins being located generally along radials generally uniformly spaced on said cog wheel means, said actuator arms having a phase displacement therebetween corresponding to the phase displacement between radials to various lamps in said paths on said simulated oscilloscope, said first frame rotatably mounting said cog wheel means and multi-position switches, a second frame, a plurality of potentiometers mounted on said second frame, gearing interconnecting said main shaft and said potentiometers in a 1:1 ratio, said second frame carrying a plurality of lamps arranged in a first line corresponding to the direction and spacing of said commercial aircraft path on said terrain panel, a third frame carrying transparent plastic rods with a first end thereof adjacent said rotatable translucent face and the second end thereof adjacent said line of lamps to transmit light therefrom to said translucent mask, an electrical circuit including said first line of lamps and a pair of power leads, first conductor means interconnecting said switches with said first line of lamps in said simulated oscilloscope, means for connecting said potentiometers in series with said first line of lamps and to said power leads to give a fading effect of the illumination of said lamps as said main shaft rotates, a second line of lamps carried on said second frame and corresponding to the direction and spacing of said intercept path on said terrain panel, second conductor means interconnecting said switches with said power leads and potentiometers and said second line of lamps in said simulated oscilloscope, at least one lamp in a third line on said second frame indicating part of the path of said simulated unidentified aircraft, third conductor means interconnecting at least one of said switches and potentiometers and said power leads with said lamp in said third line, a master selsyn rotated in synchronism with said main shaft, and connection means to energize said trace lamp from said power leads; and said interconnection means including, fourth conductor means connected in parallel with said first line of lamps to effect the indication of said commercial aircraft path on said terrain panel by the illumination of said lamp means thereof at said illuminable spaced intervals, fifth conductor means connected in parallel with said second line of lamps to effect the indication of said intercept path on said terrain panel by the illumination of said lamp means thereof at said illuminable spaced intervals, sixth conductor means connected in parallel with said lamp in said third line to effect at least partial indication of said unidentified aircraft path on said terrain panel by the illumination of said lamp means thereof, and seventh conductor means electrically connecting said master selsyn to said slave selsyn to cause rotation thereof in synchronism with said trace rod.

14. Simulated radar demonstration equipment, comprising means simulating an oscilloscope panel and terrain panel and interconnection means therebetween; said terrain panel including a three dimensional relief map to scale of a typical sample terrain, means simulating a radar station on said map, means simulating a rotatable antenna at said radar station, a slave selsyn motor to drive said rotatable simulated antenna, means simulating an air field on said map, a first transverse flight path on said map of a simulated commercial aircraft, a second transverse flight path of a simulated unidentified aircraft on said map, said first and second paths being closely adjacent for approximately the first half of each thereof and then diverging, an intercept flight path on said map of a simulated interceptor aircraft based on said simulated airfield, said intercept path originating from said simulated airfield and converging on said unidentified aircraft path within the confines of said map, each of said paths being indicated at least partially by lamp means illuminable at spaced intervals therealong, said illuminable spaced intervals of said commercial aircraft path having a generally uniform height and spacing to indicate generally uniform altitude and speed of the unidentified aircraft simulated thereby, said illuminable spaced intervals of said intercept path increasing in height and spacing along the first part of the path leading away from said simulated airfield to indicate increasing altitude and speed of the interceptor aircraft simulated thereby, said illuminable spaced intervals of said unidentified aircraft path having a generally uniform height and spacing corresponding to said commercial aircraft path during approximately said first half thereof to indicate generally uniform altitude and speed, said intercept path during the second part thereof converging on said unidentified aircraft path and corresponding in altitude thereto, said terrain map also showing simulated ground observer stations, a simulated filter center, simulated anti-aircraft stations, a simulated radar distribution center and first and second simulated municipalities; said simulated oscilloscope panel including a transparent mask, concentric circles scribed on said mask indicating range of said simulated radar station, azimuth marks scribed on said mask, a rotatable translucent green-tinted simulated oscilloscope face behind said mask, a transparent plastic trace rod generally radially disposed on said mask and rotatable therewith, a trace lamp mounted at one end of said trace rod for illumination thereof to indicate the aimed direction of said simulated radar antenna, a first frame, a main shaft journalled in said frame generally coaxially behind said rotatable face and connected thereto for simultaneous rotation, a motor and speed reduction unit connected to drive said main shaft at a predeterminable low rate of speed in the range of 1 to 10 r.p.m., a rotatable switch actuator driven from said main shaft, a plurality of multi-position switches, rotatable cog wheel means connected to said switches and having multiple cogs thereon and engageable individually by said switch actuator to partially rotate each of said wheels a fraction of a revolution corresponding to the inverse of the number of positions on one of said multi-position switches for each revolution of said switch actuator, said first frame rotatably mounting said cog wheel means and multi-position switches, a plurality of potentiometers mounted stationarily relative to said first frame, gearing interconnecting said main shaft and said potentiometers in a 1:1 ratio, a second frame carrying a plurality of lamps arranged in a first line corresponding to the direction and spacing of said commercial aircraft path on said terrain panel, a third frame carrying transparent plastic rods with a first end thereof adjacent said rotatable translucent face and the second end thereof adjacent said line of lamps to transmit light therefrom to said translucent mask, an electrical circuit including said first line of lamps and a pair of power leads, first conductor means interconnecting said switches with said first line of lamps in said simulated oscilloscope panel, means for connecting said potentiometers in series with said first line of lamps and to said power leads to give a fading effect of the illumination of said lamps as said main shaft rotates, a second line of lamps carried on said second frame and corresponding to the direction and spacing of said intercept path on said terrain panel, second conductor means interconnecting said switches with said power leads and potentiometers and said second line of lamps in said oscilloscope panel, at least one lamp in a third line on said second frame indicating part of the path of said simulated unidentified aircraft, third conductor means interconnecting at least one of said switches and potentiometers and said power leads with said lamp in said third line, said first, second, and third frames being rotatable as a unit in said simulated oscilloscope panel and rotatable relative to said main shaft to shift the azimuthal direction of said lines of lamps, a master selsyn rotated in synchronism with said main shaft, echo lamp means arranged to illuminate said face to simulate ground clutter and permanent echoes, and connection means to energize said trace lamp and echo lamp means from said power leads; and said interconnection means including, fourth conductor means connected in parallel with said first line of lamps to effect the indication of said commercial aircraft path on said terrain panel by the illumination of said lamp means thereof at said illuminable spaced intervals, fifth conductor means connected in parallel with said second line of lamps to effect the indication of said intercept path on said terrain panel by the illumination of said lamp means thereof at said illuminable spaced intervals, sixth conductor means connected in parallel with said lamp in said third line to effect at least partial indication of said unidentified aircraft path on said terrain panel by the illumination of said lamp means thereof, and seventh conductor means electrically connecting said master selsyn to said slave selsyn to cause rotation thereof in synchronism with said trace rod.

15. A simulated oscilloscope for demonstration or training purposes, comprising, a transparent mask, a first frame, a main shaft journalled in said frame generally coaxially behind said rotatable face and connected thereto for simultaneous rotation, a motor and speed reduction unit connected to drive said main shaft at a predeterminable low rate of speed, a rotatable switch actuator driven from said main shaft, a plurality of multi-position switches, rotatable cog wheel means connected to said switches and having multiple cogs thereon and engageable individually by said switch actuator to partially rotate each of said wheels a fraction of a revolution corresponding to the inverse of the number of positions on one of said multi-position switches for each revolution of said switch actuator, said first frame rotatably mounting said cog wheel means and multi-position switches, a second frame, a plurality of potentiometers mounted on said second frame, gearing interconnecting said main shaft and said potentiometers in a 1:1 ratio, said second frame carrying a plurality of lamps arranged in a line corresponding to the direction and spacing of a simulated aircraft path, a third frame carrying transparent plastic rods with a first end thereof adjacent said line of lamps to transmit light therefrom to said transparent mask, an electrical circuit including said line of lamps and a pair of power leads, first conductor means interconnecting said switches with said line of lamps, and means for connecting said potentiometers in series with said line of lamps and to said power leads to give a fading effect of the illumination of said lamps as said main shaft rotates.

16. A simulated oscilloscope for demonstration or training purposes, comprising, a transparent mask, a rotatable translucent oscilloscope face behind said mask, a transparent plastic trace rod generally radially disposed on said mask and rotatable therewith, a trace lamp mounted at one end of said trace rod for illumination thereof to indicate the aimed direction of a simulated radar antenna, a first frame, a main shaft journalled in said frame generally coaxially behind said rotatable face and connected thereto for simultaneous rotation, a motor and speed reduction unit connected to drive said main shaft at a predeterminable low rate of speed in the range of 1 to 10 r.p.m., a rotatable switch actuator driven from said main shaft, a plurality of multiposition switches, rotatable cog wheel means connected to said switches and having multiple cogs thereon and engageable individually by said switch actuator to partially rotate each of said wheels a fraction of a revolution corresponding to the inverse of the number of positions on one of said multiposition switches for each revolution of said switch actuator, said first frame rotatably mounting said cog wheel means and multi-position switches, a second frame, a plurality of potentiometers mounted on said second frame, gearing interconnecting said main shaft and said potentiometers in a 1:1 ratio, said second frame carrying a plurality of lamps arranged in a first line corresponding to the direction and spacing of a simulated commercial aircraft path, a third frame carrying transparent plastic rods with a first end thereof adjacent said line of lamps to transmit light therefrom to said translucent face, an electrical circuit including said first line of lamps and a pair of power leads, first conductor means interconnecting said switches with said first line of lamps, means for connecting said potentiometers in series with said first line of lamps and to said power leads to give a fading effect of the illumination of said lamps as said main shaft rotates, a second line of lamps carried on said second frame and corresponding to the direction and spacing of a simulated intercept path, second conductor means interconnecting said switches with said power leads and potentiometers and said second line of lamps in said simulated oscilloscope, at least one lamp in a third line on said second frame indicating part of the path of a simulated unidentified aircraft, and third conductor means interconnecting at least one of said switches and potentiometers and said power leads with said lamp in said third line, said first, second, and third frames being rotatable as a unit in said simulated oscilloscope and rotatable relative to said main shaft to shift the azimuthal direction of said lines of lamps.

17. A demonstration and training device, comprising, a terrain board and a simulated oscilloscope panel, means for indicating a first path of a simulated aircraft on said simulated oscilloscope panel, means for indicating a second path of a second simulated aircraft on said simulated oscilloscope panel, means for indicating the rotation of a simulated radar antenna on said simulated oscilloscope panel, means for indicating said first path on said terrain board in accordance with control established by said simulated oscilloscope panel, means for indicating said second path on said terrain board in accordance with control established both by said simulated oscilloscope panel and by said first path on said terrain board, and means for indicating on said terrain board the rotation of said simulated radar antenna in accordance with control established by said simulated oscilloscope panel.

18. Simulated reflected wave demonstration equipment, comprising a map panel; and means simulating an oscilloscope and interconnecting means therebetween; means simulating a rotatable reflected wave antenna on said map, drive means to rotate said simulated antenna, first electrical means to indicate the direction and speed of a movable object on a path on said map; said means simulating an oscilloscope including, second electrical means cooperating with said simulated oscilloscope and arranged to indicate a course thereon corresponding to said path, said second electrical means sequentially producing spots of light on said simulated oscilloscope to indicate the travel of said movable object progressively along said course; and said interconnecting means including first means to synchronize said drive means with said second electrical means, and second means to synchronize said first and second electrical means.

References Cited in the file of this patent

UNITED STATES PATENTS

| | | |
|---|---|---|
| 1,969,607 | Harder | Aug. 7, 1934 |
| 2,166,194 | Roman et al. | July 18, 1939 |
| 2,204,315 | Levin | June 11, 1940 |
| 2,400,149 | Immerman | May 14, 1946 |
| 2,505,094 | Bunyan | Apr. 25, 1950 |
| 2,505,793 | Rust et al. | May 2, 1950 |
| 2,562,648 | Sparrow | July 31, 1951 |
| 2,573,490 | Rheinfrank | Oct. 30, 1951 |
| 2,633,648 | Amman | Apr. 7, 1953 |